US008827226B2

(12) United States Patent
Townsend et al.

(10) Patent No.: US 8,827,226 B2
(45) Date of Patent: Sep. 9, 2014

(54) SINGLE MOUNT WITH DUAL METHOD INSTALLATION

(75) Inventors: Michael Joseph Townsend, Gilbert, AZ (US); Patrick Leonard Plehn, Chandler, AZ (US)

(73) Assignee: Ergotron, Inc., St. Paul, MN (US)

( * ) Notice: Subject to any disclaimer, the term of this patent is extended or adjusted under 35 U.S.C. 154(b) by 171 days.

(21) Appl. No.: 12/861,341

(22) Filed: Aug. 23, 2010

(65) Prior Publication Data

US 2012/0043437 A1    Feb. 23, 2012

(51) Int. Cl.
| | |
|---|---|
| *A47H 1/10* | (2006.01) |
| *A47F 5/00* | (2006.01) |
| *G06F 1/16* | (2006.01) |
| *F16M 11/20* | (2006.01) |
| *F16M 13/02* | (2006.01) |
| *F16M 11/10* | (2006.01) |

(52) U.S. Cl.
CPC ......... *F16M 13/02* (2013.01); *F16M 2200/065* (2013.01); *F16M 11/2014* (2013.01); *F16M 11/10* (2013.01); *F16M 11/2085* (2013.01); *F16M 11/2092* (2013.01); *Y10S 248/917* (2013.01); *Y10S 248/918* (2013.01); *Y10S 248/919* (2013.01); *Y10S 248/92* (2013.01)
USPC ............... 248/323; 248/278.1; 248/274.1; 248/122.1; 248/917; 248/918; 248/919; 248/920; 248/200; 248/279.1; 248/281.11; 248/240; 248/205.1; 248/207; 248/231.91; 248/298.1; 52/712; 220/3.5; 361/679.06; 361/679.07

(58) Field of Classification Search
USPC ........... 248/323, 278.1, 274.1, 288.11, 122.1, 248/125.7, 125.9, 917, 919, 920, 220.1, 248/309.1, 918, 200, 279.1, 281.11, 342, 248/240, 205.1, 207, 231.91, 298.1; 52/712; 220/3.5
See application file for complete search history.

(56) References Cited

U.S. PATENT DOCUMENTS

| | | | | |
|---|---|---|---|---|
| 2,684,220 | A * | 7/1954 | Beber et al. | 248/27.1 |
| 5,321,579 | A * | 6/1994 | Brown et al. | 361/679.06 |
| 6,298,631 | B1 * | 10/2001 | Finley | 52/742.15 |
| 6,616,309 | B2 * | 9/2003 | Kelmelis et al. | 362/371 |
| 7,285,722 | B2 * | 10/2007 | Shyr | 174/58 |
| 7,448,584 | B2 * | 11/2008 | Chen et al. | 248/278.1 |
| 7,487,943 | B1 * | 2/2009 | Gillespie | 248/282.1 |
| 7,513,469 | B1 * | 4/2009 | Ciungan | 248/161 |
| D627,767 | S * | 11/2010 | Molter et al. | D14/239 |
| 7,975,976 | B2 * | 7/2011 | Wohlford | 248/282.1 |
| 7,984,888 | B2 * | 7/2011 | Park | 248/281.11 |
| 8,245,990 | B2 * | 8/2012 | Huang | 248/276.1 |
| 2003/0155472 | A1 * | 8/2003 | Lu et al. | 248/201 |
| 2004/0262474 | A1 * | 12/2004 | Boks et al. | 248/276.1 |
| 2005/0092890 | A1 * | 5/2005 | Liao | 248/466 |
| 2005/0127253 | A1 * | 6/2005 | Kim | 248/176.1 |
| 2006/0118694 | A1 * | 6/2006 | Lee et al. | 248/923 |

(Continued)

*Primary Examiner* — Christopher Garft
(74) *Attorney, Agent, or Firm* — Schwegman Lundberg & Woessner, P.A.

(57) ABSTRACT

A dual method of installing a mounting device to a load-bearing surface includes a mounting device having a back member installed closer to the load-bearing surface than a front member on which an object is mounted. A mounting member is either attached to the back member in a first configuration or the mounting member is attached to the back member in a second configuration. The mounting member is attached to the load-bearing surface such that the load-bearing surface is between the back member and the front member in the first configuration. The back member is between the load-bearing surface and the front member in the second configuration.

10 Claims, 8 Drawing Sheets

(56) References Cited

U.S. PATENT DOCUMENTS

| | | | |
|---|---|---|---|
| 2007/0051862 A1* | 3/2007 | Monti | 248/309.1 |
| 2007/0057133 A1* | 3/2007 | Cottingham | 248/309.1 |
| 2007/0170325 A1* | 7/2007 | Ryu | 248/276.1 |
| 2008/0218952 A1* | 9/2008 | Benn | 361/681 |
| 2009/0194655 A1* | 8/2009 | Huang | 248/282.1 |
| 2010/0172072 A1* | 7/2010 | Monaco | 361/679.01 |
| 2011/0163215 A1* | 7/2011 | Walters | 248/220.22 |

\* cited by examiner

SINGLE MOUNT WITH DUAL METHOD INSTALLATION

BACKGROUND OF THE INVENTION

1. Field of the Invention

This invention relates to a dual method of installing a mounting device and a laterally adjustable mounting device.

2. Description of Related Art

Flat panel displays are increasingly prevalent in modern life. Generally, flat panel displays have a limited viewing angle, thus making the positioning of the display important to a viewer. Flat panel displays are typically placed on stands or are mounted to a wall by flat panel mounting devices. Since flat panel displays are normally thinner than conventional CRTs, when mounted to a wall, the profile of the display and the display mount from the wall is also important to a viewer. These mounting devices often include articulating joints and arms and are conventionally installed either on the wall or within the wall. For instance, the mounting device can be installed on the wall over drywall or concrete, or can be installed in the wall by installing the back plate 20 of the mounting device within a cut-out opening created prior to installing the mounting device. Installing the mounting device in the wall will provide a low profile view where a portion of the mounting device will be hidden.

However, any given mount is capable of being installed only by a single method. Furthermore, for a typical single arm type mount, the positioning of the mounted object is restricted because the arm articulates from a fixed position on the wall. Providing greater positioning freedom has previously required bulkier dual-arm mounts.

Conventionally, the installer is required to predetermine whether to install a mounting device in the wall or on the wall, and to choose a mounting device accordingly. However, users may later change their minds. Also, installers must decide whether to use a more compact single arm mount with limited positioning range or a larger dual-arm mount with increased positioning capability. The present solutions do not provide a single mount design with the ability to be easily installed in wall or on the wall without extra parts, or a single arm mount which provides superior positioning flexibility.

SUMMARY OF THE INVENTION

Various embodiments of the present invention overcome these drawbacks of the prior art and provide a mounting device with dual installation capability without the requirement for secondary installation components. The mount can be installed on-wall to provide a low profile and installed in-wall to lowers the profile to virtually zero. For example, standard residential home construction provides for 16" on-center studs that the mount is placed directly between for in-wall installation. The selectable installation method from a single mount design offers improved flexibility for the user since the single mount can be installed in multiple configurations.

Moreover, the present invention is directed to a mount, such as a single arm full-motion mount, that can be positioned laterally along its wall bracket allowing for improved adjustability in the mount. The improved lateral adjustment capabilities allows the single arm mount to be functionally equivalent with a dual-arm mount.

Accordingly, one embodiment of the invention is a dual method of installing a mounting device to a load-bearing surface includes a mounting device having a back member installed closer to the load-bearing surface than a front member on which an object is mounted. A mounting member is either attached to the back member in a first configuration or the mounting member is attached to the back member in a second configuration. The mounting member is attached to the load-bearing surface such that the load-bearing surface is between the back member and the front member in the first configuration. The back member is between the load-bearing surface and the front member in the second configuration.

Furthermore, the mounting member includes a first side directly attaching the mounting member to the back member and a second side directly attaching the mounting member to the load-bearing surface. The mounting member is a bracket. In said first configuration, an opening in the load-bearing surface is created for placement of the back member. The back member lies flush with the load-bearing surface in the first configuration. Trim is attached to conceal the installation of the mounting member. The back member is provided between two studs of the load-bearing surface in the first configuration. The first configuration is provided for in-wall installation and the second configuration is provided for on-wall installation.

In another embodiment of the present invention, a mounting device includes a front member on which an object is mounted and a back member for attachment to a load-bearing surface through a mounting member. The mounting member attaches to the back member in a first configuration where the load-bearing surface is between the back member and the front member, and the mounting member attaches to the back member in a second configuration where the back member is between the load-bearing surface and the front member.

The mounting member includes a first side directly attaching the mounting member to the back member and a second side directly attaching the mounting member to the load-bearing surface. The mounting member is a bracket. A first arm is connected to the back member through a first joint. The front member is connected to the first arm through a second joint. The back member includes a first rail and a second rail. The first joint includes a glide block that includes a first bearing and a second bearing slideable along the respective first rail and second rail of the back member.

In another embodiment of the invention, a mounting device includes a front member on which an object is mounted and a back member for attachment to a load-bearing surface. The back member includes a first rail and a second rail. The front member is connected to the back member through a glide block. The glide block includes a first bearing and a second bearing slideable along the respective first rail and second rail of the back member.

Furthermore, the glide block includes a casting on which the front member pivots. The first bearing and the second bearing are round linear bearings. A first bushing is provided between the first bearing and the first rail. A second bushing is provided between the second bearing and the second rail.

In another embodiment of the invention, a method of positioning a mounting device includes the mounting device having a front member on which an object is mounted and a back member for attachment to a load-bearing surface. A glide block is slid along a rail of the back member, where the glide block is connected between the front member and the back member.

Furthermore, the rail extends along the length of the back member. The glide block is slid to one end of said back member. An arm connecting the front member to the back member is folded parallel to the back member such that the arm is enclosed by the back member. An arm connecting the front member to the back member is pivoted around a first joint. The front member is pivoted about a second joint connecting the front member to the arm.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
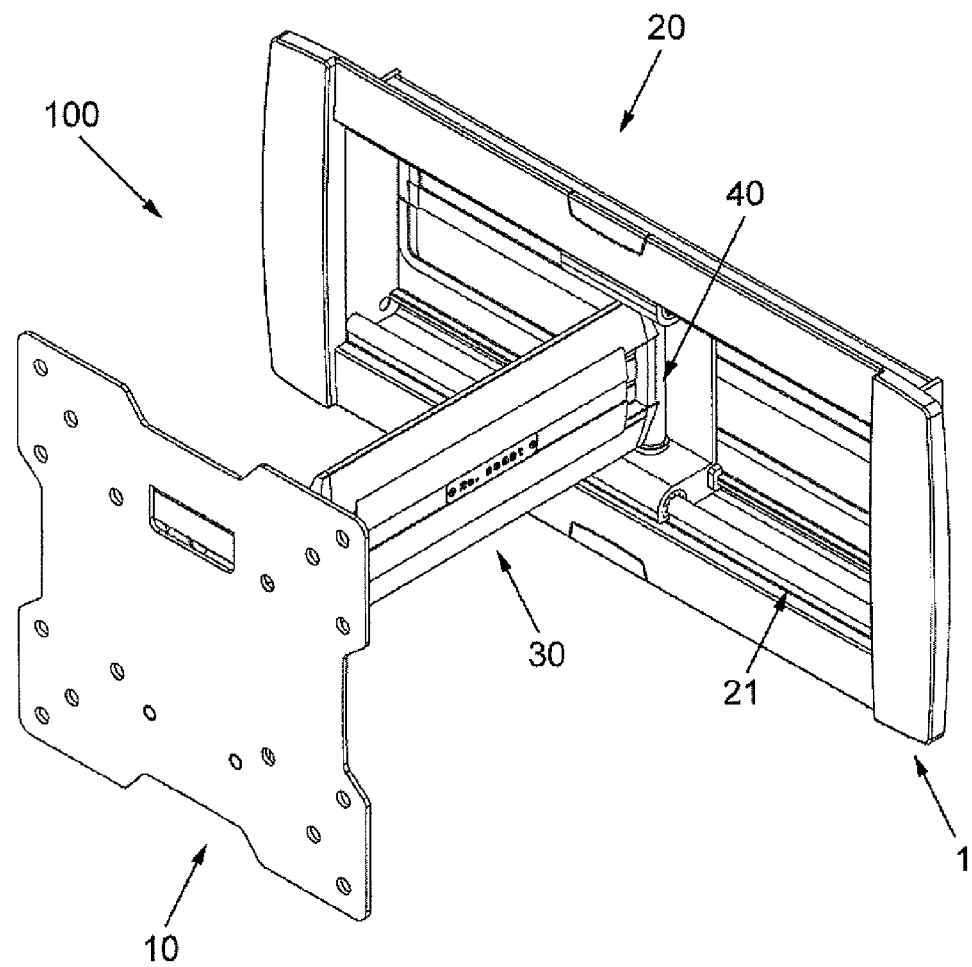
FIG. 1 is a perspective view of one embodiment of a mounting device of the invention.

One embodiment of a mounting device 100 is illustrated in FIG. 1 and can be used to display a flat panel television against a wall in a home entertainment center. Mounting device 100 includes a front member such as a front plate 10 for mounting a flat-panel display, electronic device, or any other object suitable for mounting. Opposite front plate 10 is provided a back member or back plate 20 for attaching mounting device 100 to a support structure able to bear the weight of mounting device 100 and mounted object. The support structure is preferably a wall but can be any load-bearing structure. The back plate 20 is also referred herein as a wall plate or wall box.

Optional in-wall trim 1, on-wall trim 2 and trim spacer 3 are provided to cover the top and side portions of back plate 20, and will be discussed in more detail later with respect to FIGS. 1, 3, 5 and 6. Arm trim 4 (FIG. 3) is also optionally provided over arm 30 to cover arm 30 and conceal wiring that may run through the arm 30.

Mounting device 100 includes articulating joints analogous to a human arm and can be described using similar terminology. For example, a first end of arm 30 is attached perpendicularly to back plate 20 by a shoulder joint 40 that acts as a hinge for rotation of the arm 30 about the shoulder joint 40.

Figure 2:
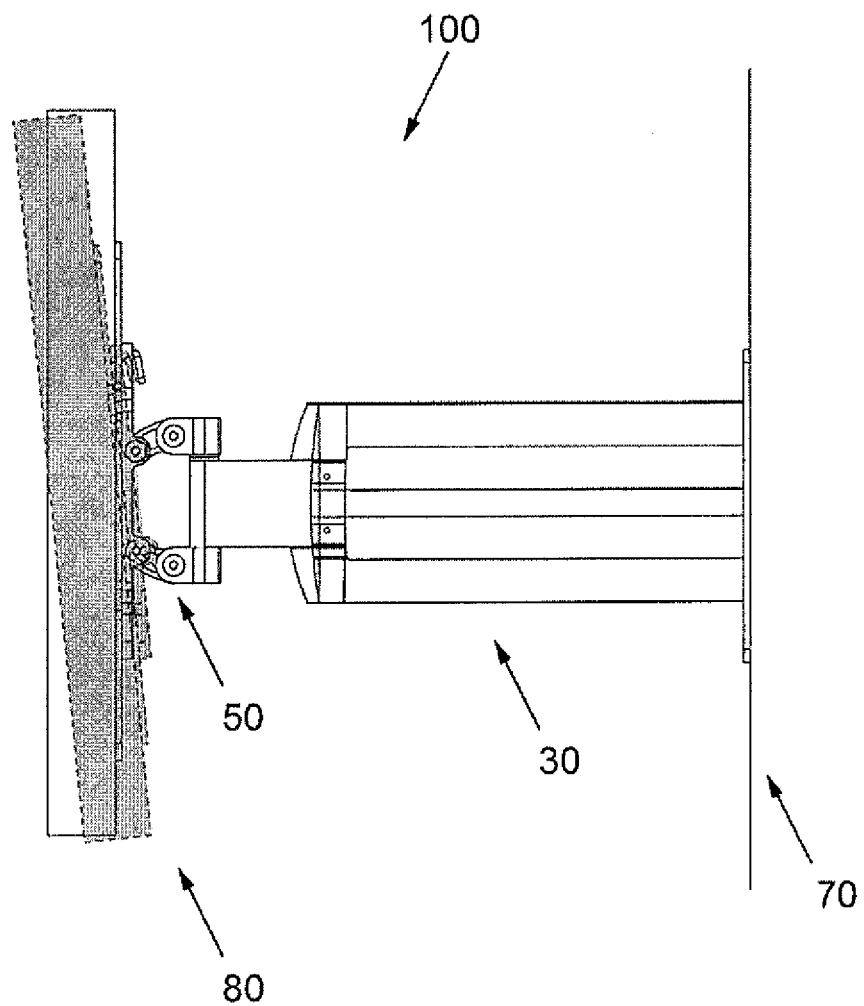
FIG. 2 is a plan view of one embodiment of the invention.

As shown in FIG. 2, a second end of the arm 30 connects to front plate 10 at wrist joint 50 that allows front plate 10 to pivot side-to-side about an axis of the wrist joint. Mounted object 80 pivots about wrist joint 50 to allow a user to position object 80 desirably. Each of the shoulder and wrist joints has a range of motion that allows mounting device 100 to be adjusted as desired by a user. The shoulder and wrist joints and may also be referred to as respective first and second joints. Alternatively, additional arms and joints may be added between the front plate 10 and back plate 20.

Figure 3:
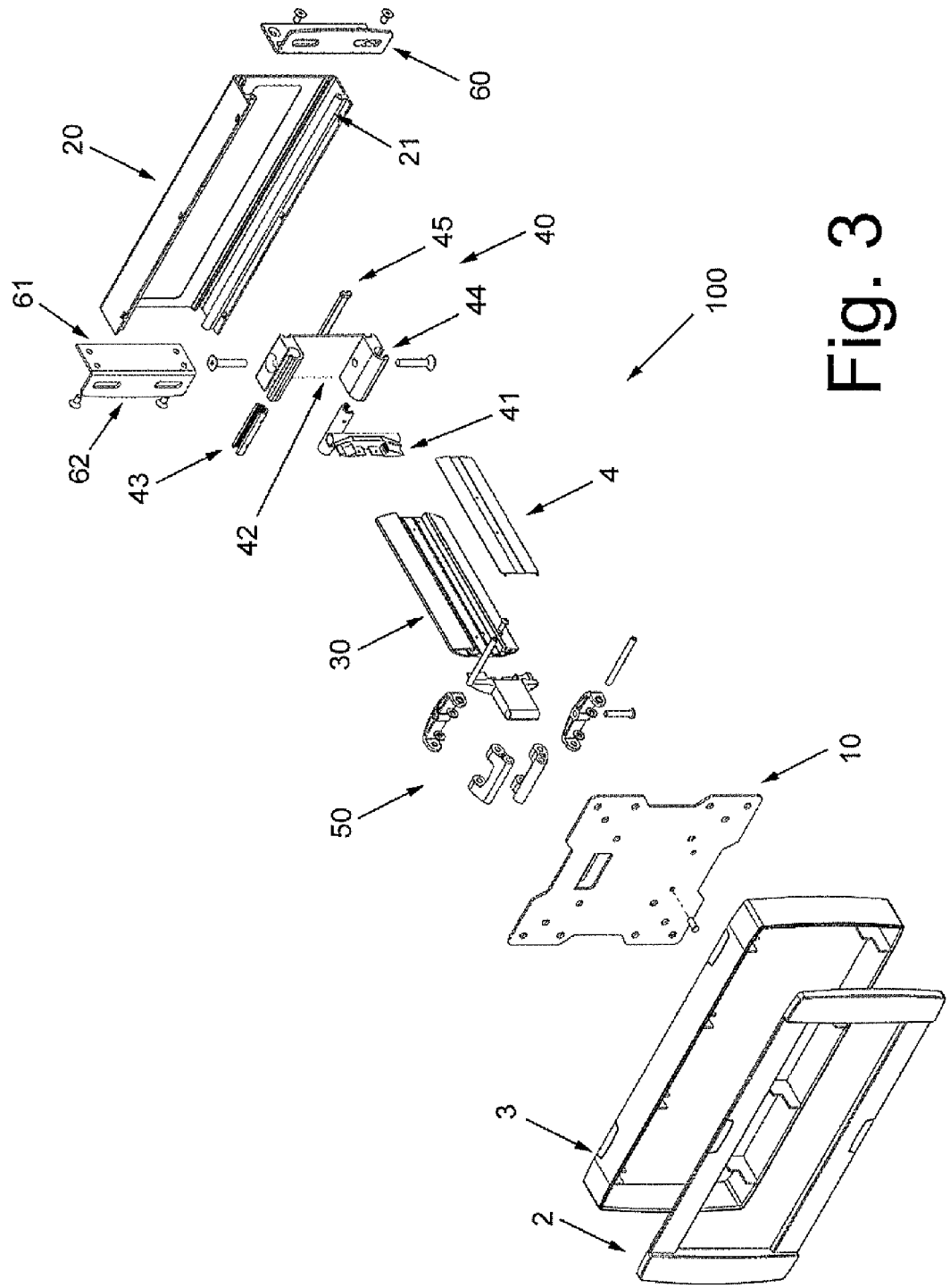
FIG. 3 is an exploded perspective view of one embodiment of the invention.

FIG. 3 illustrates the components of mounting device 100 in an exploded perspective view. Front plate 10 is provided with object mounting holes for mounting an object such as a flat panel display. The main components of shoulder joint 40 and wrist joint 50 are shown disassembled and are not limited to those illustrated. With respect to the dual-method installation aspect of the invention, the configuration of the second joint 50 will not be discussed here. The glide function of the first joint 40 and reference numbers 41-45 will be discussed in detail later. Arm 30 is provided connected to wrist joint 50 on one end and shoulder joint 40 on the other end. Arm trim 4 may optionally be attached to cover arm 30 and provide a space for cables to run as well as to improve the appearance of the mounting device 100.

Furthermore, front plate 10 and back plate 20 can be formed from steel, a metal alloy, resin or composite material. The arm 30 can be formed of metal or plastic resin such as nylon. Shoulder joint 40 attaches to back plate 20 and the back plate is mounted either on-wall or in-wall via mounting brackets 60. The mounting bracket 60 includes a first side 61 that directly attaches to back plate 20 and a second side 62 that directly attaches to either the exterior portion of a wall or the interior portion of a wall.

Figure 4:
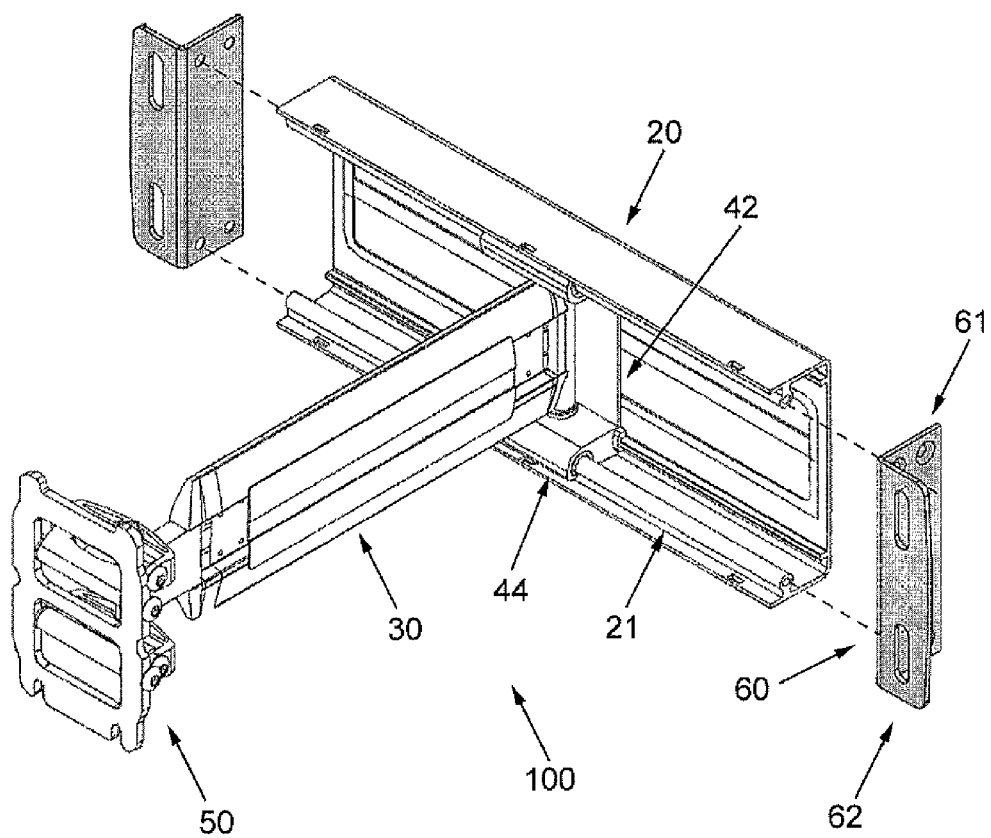
FIG. 4 is a perspective view of an in-wall embodiment of the invention.

FIG. 4 provides a perspective view of the mounting device 100 configured for in-wall installation. Mounting brackets 60 include a first side 61 attached to the back plate 20 by screws or any other known attachment method. In FIG. 4, the first side 61 is provided perpendicular to back plate 20. A second side 62 is provided parallel to the back plate 20 and perpendicular to the first side 61 with openings for attachment to the wall using any known attachment method. The second side 62 is provided closer to the front plate 10 than the back plate 20 for in-wall installation. The position of mounting brackets 60 with respect to back plate 20 in FIG. 4 is referred to herein as the first configuration. This allows the back plate 20 to be placed within a recessed portion of the wall 70. Therefore, the back plate 20, first joint 40 and a portion of arm 30 lie recessed within wall 70 after installation. In other words, second side 62 lies in a plane that intersects either the arm 30 or joint 40, but not the back plate 20.

Figure 5:
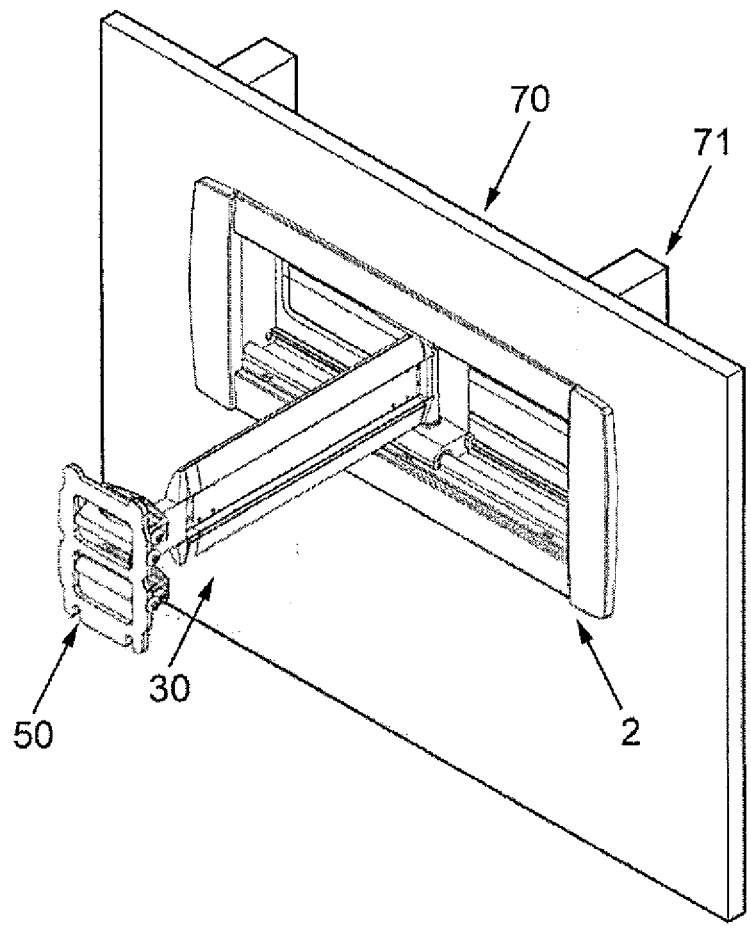
FIG. 5 is another perspective view of an in-wall embodiment of the invention.

FIG. 5 illustrates the mounting device 100 installed into a wall 70, where the mounting brackets 60 are attached to studs 71 such that the back plate 20 sits directly between the two studs 71. Prior to installation, a hole may be cut out of the wall 70 that is sized to fit the installation of back plate 20. Trim 2 may optionally be placed over the mounting brackets 60 and back plate 20 to improve its appearance after installation. To install the mounting device 100 in-wall, the user simply attaches the first side 61 of the mounting brackets 60 to the back plate 20 such that the second side 62 is between the back plate 20 and front plate 10. That is, the second side 62 lies within a plane different from the back plate 20. With respect to FIG. 5, the wall 70 is provided between the back plate 20 and the front plate 10 as a result of in-wall installation. The load bearing surface on which second side 62 attaches does not necessarily need to be formed of wood and may be any other load bearing surface such as concrete. Once installed, the back plate 20 lies flush with the wall 70.

Figure 6:
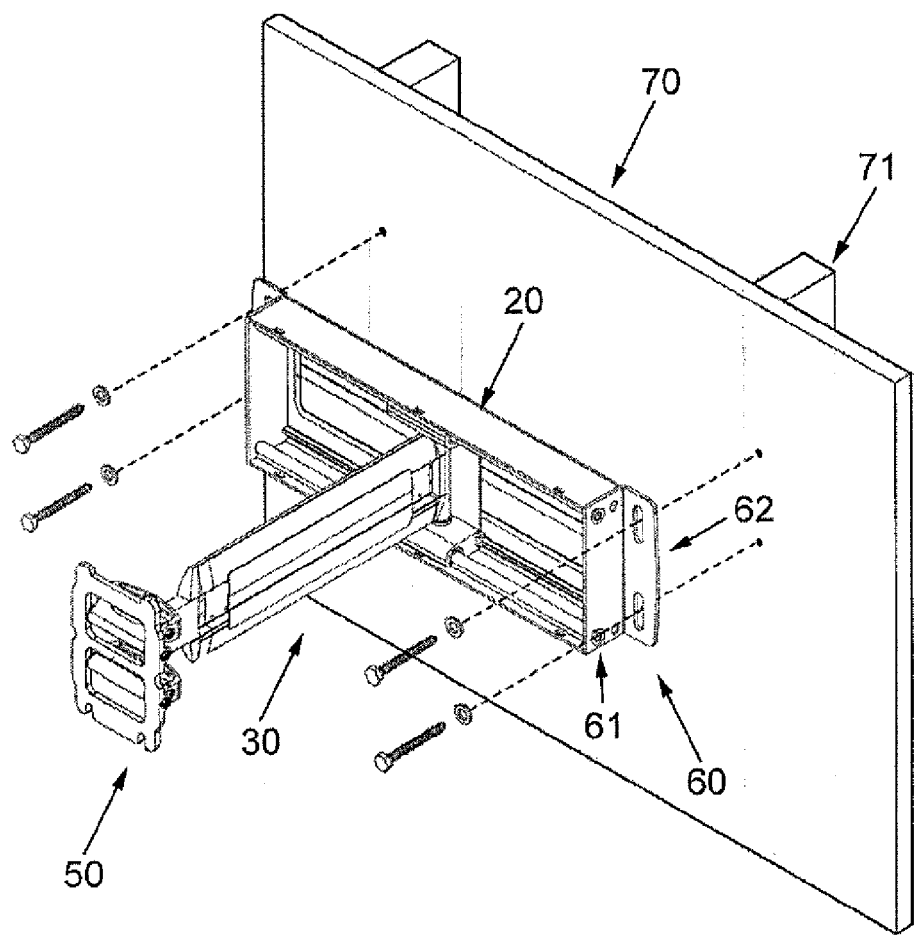
FIG. 6 is a perspective view of an on-wall embodiment of the invention.
Figure 7:
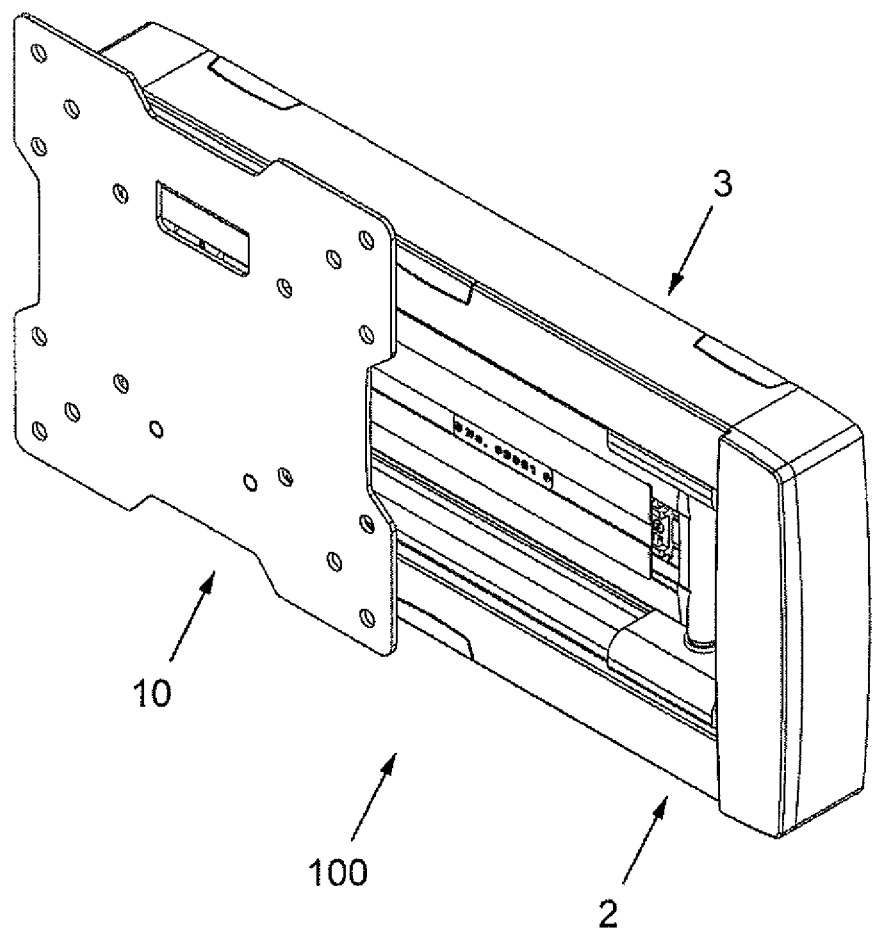
FIG. 7 is a perspective view of another embodiment of the invention.

Next, with the same components discussed above, on-wall installation will be discussed with respect to FIG. 6. In contrast to the first configuration of FIG. 4, the mounting brackets 60 of FIG. 6 are rotated 180° before attachment to back plate 20 in a second configuration and are put together such that the first side 61 is attached to back plate 20 and second side 62 is parallel to back plate 20 where the back plate 20 and the second side 62 are in the same plane. After mounting to the surface of the wall 70, the back plate 20 is between the wall 70 and the front plate 10. Trim 2 and spacer 3 may optionally be placed over the back plate and mounting brackets. The present invention allows mounting device 100 to be installed in-wall and on-wall without the need for additional components or difficult adjustments. Instead, the installer configures and attaches the mounting brackets in a first configuration for in-wall installation and a second configuration for on-wall installation of the mounting device.

The user is preferably presented with the mounting device pre-configured in the first or second configuration where the first side is pre-attached to the back plate 20. The mounting brackets 60 need not be shaped as illustrated, so long as they are attachable to the back plate in the first and second configurations that provide respective in-wall and on-wall installation. In the on-wall installation of FIG. 6, the back plate 20 contacts the wall. For on-wall installations, spacer 3 and trim 2 improve the appearance of the mount. The trim 1 snaps into and covers the top of wall plate 20 in the in-wall installations, while the trim 2 and spacer 3 cover the top and the sides of wall plate 20 in on-wall installations. Thus, by rearranging the mounting bracket on the back plate between the first and second configurations using the same installation hardware, the mounting device is easily installed either in-wall or on-wall.

Next, the glide function of the mounting device 100 will be described in detail. Joint 40 in FIG. 3 includes casting 41, glide block 42, bushings 43, round linear bearings 44 and rib linear bearings 45. Back plate 20 includes rails 21 provided to enable slideable connection for the bearings 44 and bushings 43 of glide block 42. Casting 41 connects arm 30 to glide block 42 and pivots about the glide block, thereby allowing arm 30 to be positioned desirably. In FIG. 3, a top and bottom round linear bearing 44 is provided in glide block 42. The round linear bearings 44 are formed in the shape of the letter "C" and slide into the corresponding rails 21 of back plate 20. Additional rib linear bearings 45 may also be provided on a rear of the glide block 42 that slide along corresponding rails of back plate 20.

The bushings 43 are preferably Delrin™ bushings that provide friction control that allow glide to be accomplished between the wall-box 20 and glide block 42 that the arm assembly attaches. The bushings 43 are inserted between the bearings 44 of the glide block 42 and the rails 21 of wall plate 20. Any bushing material is acceptable so long as force can be applied to move the glide block 42 laterally along the length of the wall plate 20. The rails and glide block may be formed from extruded aluminum. The first joint 40 allows a mounting device 100 such as the full-motion single arm mount described to be positioned laterally along the length of the wall plate 20. This glide feature in a single-arm mount 100 provides a functionally equivalent level of lateral positioning as a dual-arm mounting device, without the extra bulkiness and length of an additional arm. In the present invention, the rear pivot point is no longer fixed, and can easily glide along rails for improved flexibility. As shown in FIG. 1, the rails 21 extend to each end of the back plate 20 to maximize lateral positioning. In FIG. 4, the rails 21 may also be provided as a connection point to the first slide 62 of mounting bracket 60.

Figure 8A:
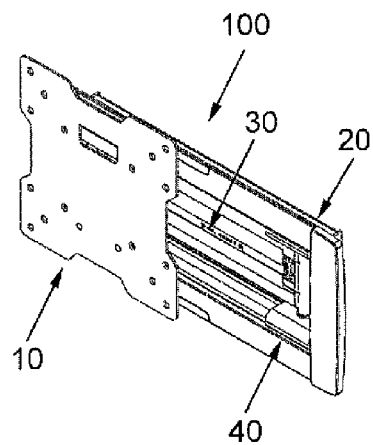
FIG. 8A is a collapsed perspective view of an in-wall embodiment of the invention.
Figure 8B:
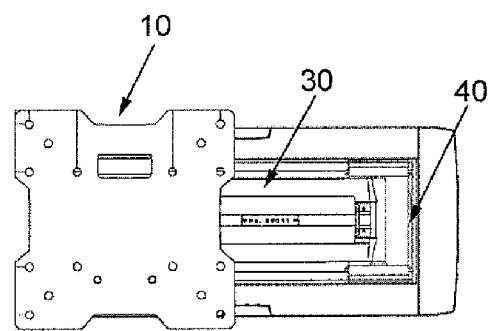
FIG. 8B is a collapsed front view of an in-wall embodiment of the invention.
Figure 8C:
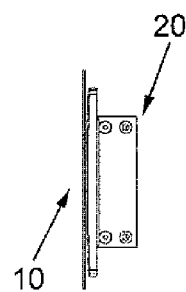
FIG. 8C is a collapsed side view of an in-wall embodiment of the invention.
Figure 8D:
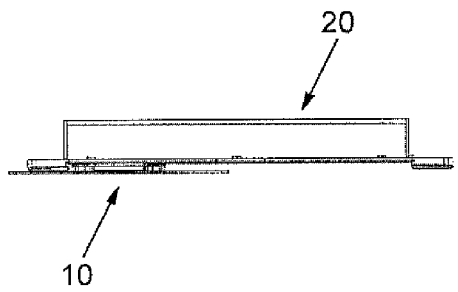
FIG. 8D is a collapsed plan view of an in-wall embodiment of the invention.

As shown in FIGS. 8A-8E, the arm 30 and glide block 40 may be positioned so as to provide a virtually zero low-profile look. When the mounting device 100 is installed in-wall, and the arm 30 is recessed with the wall plate 20, the mounted object is provided with an extremely low profile to the wall. FIGS. 8A and 8B show the in-wall configuration of the mounting device 100 in collapsed form where glide block 40 is placed at either end of wall plate 20 and arm 30 is completely folded into the wall plate 20 so as to not protrude out from the wall. FIGS. 8C and 8D illustrate the compactness of the mounting device, which is also capable of the full extension of FIGS. 1 and 2. Accordingly, the glide function allows the arm 30 to be recessed into the wall plate to hide the arm when extension is not desired. In this manner, the length of an arm can be increased while still allowing for a hidden appearance.

The particular embodiments of the invention described in this document should be considered illustrative, rather than restrictive. Modification to the described embodiments may be made without departing from the spirit of the invention as defined by the following claims and their equivalents.

The invention claimed is:

1. A mounting device comprising:
   a front member on which an object is mounted;
   a back member connected to said front member and spaced rearward of said front member, said back member for attachment to a load-bearing surface through a mounting member having a first surface and a second surface; and
   said mounting member attaches to said back member in a first attachment configuration where said second surface is between said back member and said front member and a load-bearing surface is between said back member and said front member, and said mounting member attaches to said back member in a second attachment configuration different from the first attachment configuration where said second surface is in a same plane as said back member and said back member is between said load-bearing surface and said front member.

2. The mounting device of claim 1 the first side directly attaching said mounting member to said back member and the second side directly attaching said mounting member to said load-bearing surface.

3. The mounting device of claim 1, wherein said mounting member is a bracket.

4. The mounting device of claim 1, further comprising:
   a first arm connected to said back member through a first joint;
   said front member connected to said first arm through a second joint.

5. The mounting device of claim 4, wherein
   said back member includes a first rail and a second rail;
   said first joint includes a glide block, wherein said glide block includes a first bearing and a second bearing slideable along respective said first rail and said second rail of said back member.

6. A mounting device for in-wall installation, the mounting device comprising:
   a front member on which an object is mounted;
   a back member spaced rearward of said front member, said back member including a first rail and a second rail, said first rail positioned above said second rail, said back member including two ends and a back portion extending therebetween, wherein the back portion is configured to extend in a first plane that is rearward of a surface of a wall;
   a first mounting bracket and a second mounting bracket, each of the first and second mounting brackets having a first side configured to attach to a respective end of the back member, each of the first and second mounting brackets having a second side configured to attach to a respective load bearing surface, wherein the second side of each of the first and second mounting brackets extends in a second plane when the first and second mounting brackets are attached to the back member, the second plane being different from the first plane;

said front member connected to said back member through a casting pivotably connected to a glide block;

wherein said glide block includes a first bearing and a second bearing slideable along respective said first rail and said second rail of said back member, said first bearing is provided below said first rail and said second bearing is provided above said second rail, and said casting is positioned rearward of said first rail and said second rail.

7. The mounting device of claim 6 wherein said first bearing and said second bearing are round linear bearings.

8. The mounting device of claim 6, further comprising:
a first bushing provided between said first bearing and said first rail; and a second bushing provided between said second bearing and said second rail.

9. The mounting device of claim 1, wherein the first and second surfaces are perpendicular to each other.

10. The mounting device of claim 1, wherein the load-bearing surface is a portion attached to the back member.

* * * * *